US009652606B2

United States Patent
Cavanagh et al.

(10) Patent No.: US 9,652,606 B2
(45) Date of Patent: May 16, 2017

(54) CLOUD-BASED ACTIVE PASSWORD MANAGER

(71) Applicants: Edward T Cavanagh, Malvern, PA (US); Michael J DiDomenico, Malvern, PA (US); Brittney Burchett, Malvern, PA (US)

(72) Inventors: Edward T Cavanagh, Malvern, PA (US); Michael J DiDomenico, Malvern, PA (US); Brittney Burchett, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 1 day.

(21) Appl. No.: 14/791,603

(22) Filed: Jul. 6, 2015

(65) Prior Publication Data

US 2017/0011213 A1    Jan. 12, 2017

(51) Int. Cl.

| | | |
|---|---|---|
| *G06F 15/16* | (2006.01) | |
| *G06F 17/30* | (2006.01) | |
| *H04L 29/06* | (2006.01) | |
| *G06F 21/45* | (2013.01) | |
| *H04L 29/08* | (2006.01) | |

(52) U.S. Cl.
CPC ............ *G06F 21/45* (2013.01); *H04L 63/083* (2013.01); *H04L 67/02* (2013.01)

(58) Field of Classification Search
CPC ........ G06F 21/45; H04L 63/083; H04L 67/02
USPC ...................................................... 726/26, 6
See application file for complete search history.

(56) References Cited

U.S. PATENT DOCUMENTS

| | | | | |
|---|---|---|---|---|
| 8,539,568 B1* | 9/2013 | Milas | ...................... | G06F 21/41 726/8 |
| 8,839,408 B1* | 9/2014 | McKinnon | .......... | H04L 63/0209 709/223 |
| 8,875,261 B2* | 10/2014 | Delia | ...................... | G06F 21/31 726/24 |
| 9,294,452 B1* | 3/2016 | Jakobsson | ............... | H04L 63/08 |
| 2003/0041251 A1* | 2/2003 | Kumhyr | .................. | G06F 21/31 713/184 |
| 2007/0028299 A1* | 2/2007 | Albano | .................... | G06F 21/46 726/5 |
| 2009/0165102 A1* | 6/2009 | Zagni | ...................... | G06F 21/31 726/6 |
| 2010/0017616 A1* | 1/2010 | Nichols | ................... | G06F 21/41 713/183 |

(Continued)

OTHER PUBLICATIONS

Haibo Yang; Where are we at with cloud computing?: A descriptive literature review; Communications of the Association for Information Systems; vol. 31, Article 2; Year: 2012; p. 1-29.*

*Primary Examiner* — Monjour Rahim
(74) *Attorney, Agent, or Firm* — Robert P. Marley

(57) ABSTRACT

Methods and systems for periodically generating and managing passwords for one or more websites of users are disclosed. The users are provided with the ability to automatically replace their old passwords with new passwords for their one or more website accounts. The users can set a pre-determined frequency at which their passwords are to be updated and replaced with new passwords. The users can further define additional one or more rules based on which their passwords are updated. The methods and systems are further configured to auto log into user's website accounts with the updated passwords.

18 Claims, 5 Drawing Sheets

(56) References Cited

U.S. PATENT DOCUMENTS

| | | | |
|---|---|---|---|
| 2010/0100948 A1* | 4/2010 | Delia | G06F 21/31 |
| | | | 726/6 |
| 2011/0047606 A1* | 2/2011 | Blomquist | G06F 21/41 |
| | | | 726/7 |
| 2014/0280932 A1* | 9/2014 | Braun | H04L 63/10 |
| | | | 709/225 |
| 2015/0039908 A1* | 2/2015 | Lee | G06F 21/35 |
| | | | 713/193 |
| 2015/0143510 A1* | 5/2015 | Hanthorn | G06F 21/62 |
| | | | 726/19 |

* cited by examiner

CLOUD-BASED ACTIVE PASSWORD MANAGER

TECHNICAL FIELD

The presently disclosed embodiments are related in general to password manager systems, and more particularly the presently disclosed embodiments are related to methods and systems for automatically generating and managing passwords for one or more websites of one or more users.

BACKGROUND

Most internet websites such as banking websites, social networking websites, and online shopping websites require users to provide login credentials such as username and password in to order access their features. As the amount of internet activity is tremendously high in today's world, generally users have more than one account on different internet websites and therefore have to maintain several number of different login credentials for each of those internet websites accounts. To simplify this problem, some people will create accounts on different Internet websites with the same username and password, often resulting in a security vulnerability. On the other hand, some users tend to create different passwords for different internet websites. The creation of different passwords for different internet websites accounts becomes problematic, as users need to remember several passwords associated with their several internet websites accounts. It is also generally recommended by cyber security professionals for security of the internet websites accounts that the passwords for at least the internet websites accounts that has confidential and sensitive data such as bank accounts to be changed frequently. Users seldom change the passwords of their internet websites accounts frequently, and some of the users who may change the passwords of their internet websites accounts frequently find it extremely difficult to remember their so many passwords.

Conventional password managers are now used by several users to manage their multiple passwords for multiple internet websites accounts. Conventional password managers store passwords of the users multiple internet websites accounts. This allows the users to easily recall their passwords using their password managers when they go to the internet websites that require password access. The conventional password managers are generally software based, and require the user to create and change the passwords of their internet websites accounts locally on their computing device, and then update the password manager database with the updated passwords. The conventional password managers act as a single storage point for the user's multiple passwords. Therefore, at any given point of time the user retains the knowledge of their passwords even after employing the password manager since the users themselves generate their passwords and use the password managers as a storage facility for the passwords. The creation of multiple passwords for multiple accounts may be burdensome for the users, and, in addition, when several websites require the user to change the password every couple of weeks or months, it becomes an even bigger burden for users. Some password managers may also involve setting up a single password for multiple internet websites of the user. This approach is quite vulnerable to data breaches because if the password of one of the internet website account is leaked then it may lead to unauthorized access to the other internet websites where the user has accounts as well.

The other drawbacks of the conventional software based password managers is that that they are generally vulnerable to so-called Trojan key malware attacks, whereas portable password managers can operationally fail which may cause loss of access to the passwords. Moreover, even after using any of these conventionally available password managers, the users still have to stay updated with news of data breaches, as these password managers are susceptible to data breaches. These data breaches can cause the user to have to manually go and change the login credentials for all accounts stored in the password manager. In addition, the regular updating/changing of the passwords is still required to be done by the users and then the new passwords have to be updated in these password manager databases. This is often a time-intensive process that frustrates the users.

Therefore, there is a need in the art for methods and systems that addresses the above-mentioned drawbacks of the conventional password managers and thereby able to efficiently manage and update passwords.

SUMMARY

Methods and systems disclosed herein address the above issues, and may provide a number of other benefits as well. Methods and systems described herein provide a cloud based active password manager that solves the above mentioned drawbacks of the conventional password managers by providing users the ability to automatically update the passwords of each of the their one or more website accounts. In an embodiment, a website account is referred to as an account created by a user on a given website. For example, a user may have a Facebook account, a Gmail account or any other website account. Thus, each user can efficiently and securely manage and update the passwords of their one or more website accounts with this option to auto update their passwords.

In one embodiment, a computer-implemented method is provided for generating, updating, and managing passwords of one or more website accounts of a user. The computer-implemented method includes receiving by a password manager server an access credential from a host computer; the access credential often comprises a password. The computer-implemented method further includes synchronizing cryptographic key information by the password manager server between a client device and the password manager server wherein the client device comprises non-transitory machine-readable storage media storing a unique seed value. The computer-implemented method further includes at a predetermined time frequency generating by the password manager server a new password replacing the password of the access credential based on at least the unique seed value and a time-date stamp.

In one embodiment, a computer-implemented method is provided for generating, updating, and managing passwords of one or more website accounts of a user. The computer-implemented method includes receiving by a password manager server an access credential from a host computer. In many cases, the access credential of the user comprises a password for authenticating user access. The computer-implemented method further includes synchronizing cryptographic key information by the password manager server between a client device and the password manager server wherein the client device comprises non-transitory machine-readable storage media storing a unique seed value. The computer-implemented method further includes at a predetermined time frequency receiving by the password manager server from the client device a new unique password that updates the password of the access credential stored in the password manager server. The new unique password is generated based on the unique seed and a time-date stamp.

In one embodiment, a system is provided for generating, updating, and managing passwords of one or more website accounts of a user. The system comprises a communication network, a host computer, a client device, and a password manager server. The host computer is configured to transmit an access credential to the password manager server over the communication network. In many cases, the access credential of the user comprises a password for authenticating user access. The client device comprises non-transitory machine-readable storage media storing a unique seed value. The password manager server is configured to synchronize cryptographic key information between the client device and the password manager server, and at a predetermined time frequency generate a new password replacing the password of the access credential. The new password is generated based on at least the unique seed value and a time-date stamp.

In one embodiment, a system is provided for generating, updating, and managing passwords of one or more website accounts of a user. The system comprises a communication network, a host computer, a client device, and a password manager server. The host computer is configured to transmit an access credential to the password manager server over the communication network. In many cases, the access credential comprises a password for authenticating the user. The client device may comprise non-transitory machine-readable storage media configured to store a unique seed value. The client device is configured to synchronize cryptographic key information between the client device and the password manager server, and at a predetermined time frequency generate a new password replacing the password of the access credential. The new password is generated based on at least the unique seed value and a time-date stamp.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification, illustrate an embodiment of the invention, and together with the specification, explain the invention.

DETAILED DESCRIPTION

Figure 1:
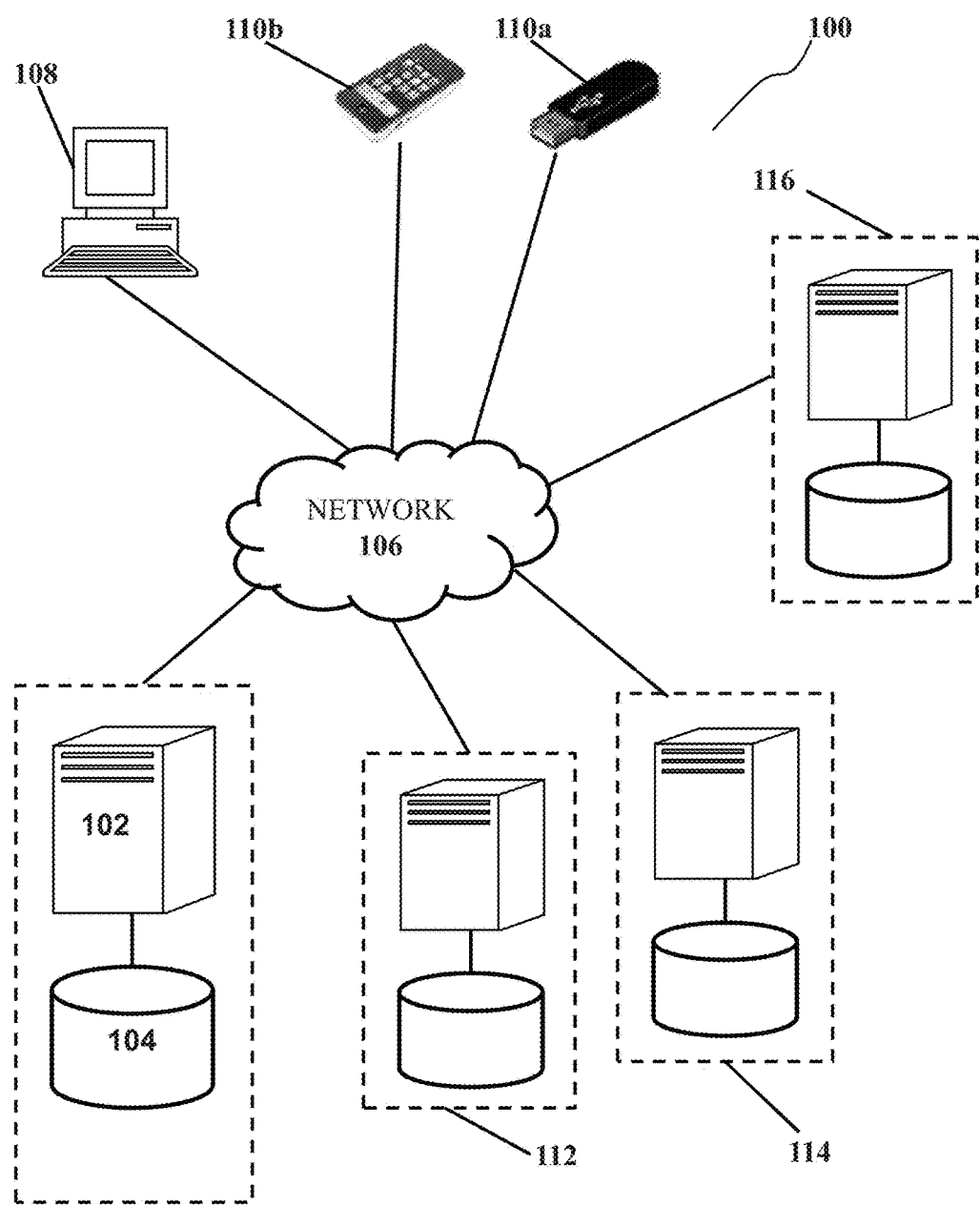
FIG. 1 illustrates components of a cloud based active password manager system in accordance with at least one embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Described herein is a cloud-based, active password manager. System and method embodiments of the password manager may manage and periodically update user passwords for one or more website accounts. The first time a user accesses a website the cloud based active password manager may automatically load, or otherwise access, the given website, and then using a current user name and a current password provided by the user for a first time, the password manager may log into the account of the user. After successfully logging in, the cloud based active password manager then navigates to a webpage of the given website to access an option to change the current password. Then, it the password manager generally enters an old password and generates a new password, automatically. The new password may then be used by the cloud based active password manager to log in to the given website account when, in the future, the user requests to access the given website account.

A user can create a set of rules on the cloud based active password manager to automatically change passwords for each of the user's one or more website accounts. For example, the set of rules may include a pre-determined time frequency setting indicating an interval or period at which the passwords of the users' one or more website or network accounts should be automatically updated. The pre-determined time frequency can be any interval of time, such as seconds, minutes, hours, days, or months. The cloud based active password manager thus allows the user to facilitate the automatic creation and replacement of the old passwords based on a one-time instruction, provided while setting up the user's account with the cloud based active password manager, thereby preventing the user or other party from manually changing the passwords or intercepting the user's updated passwords.

The cloud based active password manager may facilitate using one or more client devices to securely generate new passwords for the user's website and network accounts, and to replace old passwords with the new passwords for the user's website or network accounts. The user can configure a client device to update and manage the passwords of website or network accounts. In some implementations, client devices may be portable devices (e.g., USB drive, smartphone). In some implementations, client devices may be software-based, which may be installed on any computing device associated with or otherwise accessible to the user. The one or more client devices may be synchronized with a password manager server hosting the cloud based active password manager to exchange information, which may be needed to update and manage the passwords.

In some cases, the user can customize the configuration of the one or more portable client devices in a way to allow different access-levels to different client devices of the one or more client devices of the one or more website accounts of the user. The one or more portable client devices are synchronized with the password manager server in such a way that the password manager server exchanges information with a given client device of the one or more client devices only if the given client device has been configured to have access to the credentials for a given website account of the user for which the information is being requested. Additionally, multiple users can have access to the credentials for corporate and/or group accounts. For example, a user might have access to the Facebook page of their company website along with other employees.

In all cases, the passwords generated for the one or more website accounts of the user are never stored within a client device or any server hosting or otherwise associated with the password manager. Each time a user generates a request using a given client device to log into a given website or network account, then the given client device and the password manager server share information regarding the website or network account, where the information may serve as data inputs into an algorithm that re-generates the current (valid) password for the given website or network account. Thus, at any given point in time, the current password for any given website or network account is not stored in memory, which mitigates security issues that may arise due to theft of the password.

In one implementation, the password manager may implement a learning algorithm that may be used to update the password manager's rules, used for generating replacement passwords. The learning algorithm may employ web parser software to identify elements of webpages (e.g., text, fields, images), which the password manager may then use to identify, e.g., the website's password requirements and security behaviors. Using a web parsing technique, a first step involves the loading of a webpage of the given website account for which the password needs to be changed. Thereafter, the data on the web page is parsed and matched with various pre-stored keywords to identify a login and/or a change password fields such as "login", "sign in", "reset password", or the like on the webpage of the given website. The pre-stored words are automatically being chosen depending upon the website account being parsed. Whenever the password for the given website account is being changed for a first time, the web parser technique employed by the learning algorithm upon successfully changing the passwords will store the steps that were followed and the keywords that were used to identify the login and/or change password fields for easy access to the given website account in the future.

In one implementation of a user-capture learning algorithm, the user may be prompted to change the password for a given website or network account for a first time, and then the user-capture learning algorithm saves the step-by-step procedure performed by the user to successfully change the password of the given website or network account. If the password for the given website or network account has to be changed for a second time, the user-capture learning algorithm will employ the same step-by-step procedure followed by the user for the first time to successfully change the password for the given website or network account. It should be appreciated that any learning algorithm may be executed and updated for user or automated updates for network accounts (e.g., LDAP, Kerberos, SharePoint®), as well as for web-based tools hosted on websites.

Passwords of multiple website accounts are managed and auto-updated by cloud based active password managers as described in the present disclosure. The websites may include but are not limited to social networking websites, such as Twitter®, Facebook®, and MySpace®; banking websites, such as Bank of America®, HSBC®, and Citibank®; and online shopping websites, such as Amazon®, EBay®, and Alibaba®. The features of the cloud based active password manager system include generating passwords for the multiple website accounts of a user, unique password generation for each of the multiple website accounts of the user, automatic updating of the passwords for the multiple website accounts of the user, one or more rules that control the automatic updating of the passwords for the multiple website accounts of the user, secure learning algorithms and methods employed for the generation and auto-update of the passwords for the multiple website accounts of the user, different types of password managers used for managing and updating of the passwords for the multiple website accounts of the user, ability to select the number of password managers used for managing and updating of the passwords for the multiple website accounts of the user, and ability to revoke access of the password managers to manage and update the passwords of the multiple website accounts of the user. It should be appreciated that embodiments of the password manager system may be fully or partially automated, and have minimal user operation. In addition, the embodiments may be scalable and may be customized based on requirement sets defined by a user or an administrator of a cloud based active password manager system.

In some embodiments, the cloud based active password manager system comprises a portable password manager device, which may be device comprising computing hardware capable of executing various tasks and processes of a password manager. The terms "password manager device" and "client device" may be interchangeably used hereinafter. In one example, the password manager device is a USB device. In another example, the password manager device is a flash memory device. The password manager device is configured to connect to and communicate with a host computer, such as a personal computer, a laptop, a personal digital assistant (PDA), a mobile device, a tablet, or any other computing device capable of communicating using a wired or wireless communication method, such as Bluetooth, NFC, or the like. The password manager device generally comprises one or more processors and a non-transitory machine-readable storage memory. The password manager device may further be configured to execute one or more software modules for managing the passwords of the multiple website accounts, updating the passwords of the multiple website accounts, monitoring and identifying the login procedures for the multiple website accounts, and recording of any login data received from one or more password manager servers and/or other computing devices of the cloud based active password manager system. The password manager device may further include a graphical user interface (GUI) to manage the password manager device's operation. In some cases, access to the password manager device may be password-protected and thus requires the user input authenticating credentials. In such cases, the GUI may allow the user to input the requisite login credentials, which may then be sent to authentication modules on the password manager device or on a separate system (e.g., authentication server).

Additionally or alternatively, embodiments of a cloud based active password manager system may comprise a password manager software module, which may be a software based password manager. The software based password manager may comprise of programs and instructions executed by a host computer, such as a personal computer, a laptop, a personal digital assistant (PDA), a mobile device, a tablet, or any other computing device. The software-based password-manager module may include a configuration file enabling automatic activation of the software application or is processed by the host computer. The password manager module may further comprise and execute one or more software programs capable of managing the passwords of the multiple website accounts, updating the passwords of the multiple website accounts, monitoring and identifying the login procedures for the multiple website accounts, and recording of any login data received from one or more password manager servers and/or other computing devices of the cloud based active password manager system.

A cloud based active password manager system may comprise a password manager device and a password manager server that are synchronized with each other, and thus work together to generate, update, and manage passwords for multiple website or network accounts. The password manager device is a portable device that communicates with the password manager server of the cloud based active password manager system to generate, update and manage the passwords for multiple websites of the user. The password manager device and the password manager server may automatically update the passwords of the user's multiple website accounts based on one or more rules defined by the user or an administrator of the cloud based active password manager system. In some cases, the password manager device may be software-based modules installed on a host device. In some cases, the password manager device may be a portable client device that is plugged into the host computer, or communicates with the hosting computing device over a wired or wireless connection. The host computer may be used by the user to browse websites or network resources that require access credentials (e.g., login ID, passwords). The host computer may use the password manager device to auto-input the passwords of the user's website accounts. In some embodiments, the password manager device may invoke remotely one or more commands related to generating, updating, inputting, or managing the passwords of the multiple website accounts of the user using any remote communication technology available in the art.

A cloud based active password manager system may comprise a password manager device and a password manager server that work together to generate, update, and manage passwords for multiple website accounts of a user. The password manager device is a portable device with the user, and communicates with the password manager server based on an instant or predetermined set of instructions from the user. The password manager device and the password manager server may automatically update the passwords of the user's multiple website accounts based a set of rules. The user can pre-define the set of rules for each of its multiple website accounts. The pre-defined set of rules may generally include instructions related to managing and updating of the passwords. In one example, a rule may define a password length. In another example, a rule may define a frequency for updating a given password for a given website account. In yet another example, a rule may indicate that a password must include all character types. In yet another example, a rule may indicate a password may not repeat a same character. In yet another example, a rule may indicate that a password shall include a combination of uppercase characters, lowercase characters, special characters, and numbers. Since the user can define a separate set of pre-defined rules for each of the multiple website accounts, then in one case, the user may pre-define the rules that for a Facebook® account, the password must include at least a total of eight digits comprising at least one each of an uppercase character, a lowercase character, and a special character. In another case, the user may pre-define another set of rules for a Bank of America® account in which the rule states that the password must include at least a total of twenty digits comprising at least one uppercase character, at least one lower case character, and no special character.

A network may include a medium that connects various computing devices, servers, and database. Examples of a network include, but are not limited to, LAN, WLAN, MAN, WAN, and the Internet. The communication over the network may be performed in accordance with various communication protocols such as Transmission Control Protocol and Internet Protocol (TCP/IP), User Datagram Protocol (UDP), or any other communication protocols.

A computing device may be a device with a processor/microcontroller and/or any other electronic component, or a device or a system that performs one or more operations according to one or more programming instructions. Examples of a computing device include, but are not limited to, a desktop computer, a laptop, a personal digital assistant (PDA), a tablet computer (e.g., iPad®, Samsung Galaxy Tab®), or the like. A computing device is capable of communicating with the server and the database through a network, using wired or wireless communication capabilities.

FIG. 1 shows components of a cloud based active password manager system 100 in accordance with various embodiments. The exemplary embodiment of the cloud based active password manager system 100 comprises a password manager server 102, password management database 104, a network 106, a host computer 108, a first client device 110a, and a second client device 110b. Hereinafter the first client device 110a and the second client device 110b when referred together will be mentioned as client devices 110. The exemplary embodiment of the cloud based active password manager system 100 further comprises a Facebook® server 112, a Twitter® server 114, and a Bank of America® server 116. It should be appreciated that the terms "cloud based active password manager system," "password manager," "system" may be used interchangeably. Moreover, the terms "password management database" and "database" may also be interchangeably used.

The password manager server 102 may be any computing device comprising a processor that executes various software modules associated with the cloud based active password manager system 100. The examples of the password manager server 102 may include but are not limited to a personal computer and a server computer. Although the password manager server 102 in the exemplary system 100 is shown in FIG. 1, as a single computing device, the password manager server 102 can be implemented as a set of computing devices executing the various modules of the cloud based active password manager system 100 in a distributed computing environment. In some embodiments, the cloud based active password manager system 100 may comprise a plurality of servers. The number of the servers employed is scalable and differ at any given point of time depending on various factors including but not limited to the number of users using the cloud based active password manager system 100. The password manager server 102 may comprise non-transitory machine-readable storage media capable of hosting one or more databases and/or repositories containing information or files. The processor of the password manager server 102 may then execute software modules associated with the relevant one or more databases and/or repositories. The password manager server 102 may further comprise any networking hardware such as the network interface card, firmware, and software modules that enable the password manager server 102 to communicate with the various other computing devices and servers associated with the cloud based active password manager system 100.

The password manager server 102 is configured to facilitate authentication services for authenticating users and devices attempting to access various resources of the cloud based active password manager system 100, such as client devices, computing devices, host computer, other servers, and databases. Some embodiments of the cloud based active password manager system 100 may comprise an authentication server (not shown), which may be a computing device comprising a processor executing the software modules providing the cloud based active password manager system 100 with the authentication services. Software modules providing the cloud based active password manager system 100 with authentication services may access a credentials database (not shown), which may be a non-transitory machine-readable storage media storing security-related data, such as access control lists determining access rights for users, devices, and other resources; access credentials, such as usernames, passwords, biometric data, keycard or token data; encryption keys; among other security based features that require centrally stored information to function. The credentials database may reside on the computing device providing the cloud based active password manager system's 100 authentication services, which may be the password manager server 102 or a distinct authentication server (not shown). However, the credentials database may reside on computing device comprising non-transitory machine-readable storage memory and is communicatively coupled to the password manager server 102 over the network 106 of the cloud based active password manager system 100.

The password management database 104 is a database storing profile attributes of one or more users. The password management database 104 further stores a list of websites submitted by an administrator of the cloud based active password manager system 100. The list of websites may include one or more social networking websites list, one or more banking websites list, and one or more online shopping websites list. In an embodiment, the list of websites stored in the password management database 104 may further include the one or more websites monitored and identified by the cloud based active password manager system 100 in which a user uses or maintains a login ID and a password. Each of the one or more websites that are stored in the password management database 104 include a name of the website, a uniform resource locator of the website, and/or any other information that can be used to identify a particular website. In an embodiment, the user may initially input the details of the one or more websites to create a list of websites on a password manager application/platform that needed to be managed by the cloud based active password manager system 100. The details of the websites inputted by the user are then stored in the password management database 104. The user may modify the list of websites by adding or removing any of the websites at any point of time that are to be managed the cloud based active password manager system 100. The modified list of the websites is then stored in the password management database 104.

The password management database 104 may be hosted by any computing device that comprises non-transitory machine-readable storage medium and is communicatively coupled, or otherwise accessible, to the password manager server 102. In one embodiment, the password management database 104 may be hosted on the password manager server 102. In another embodiment, the password management database 104 may be hosted on a distinct computing device that is communicatively coupled to the password manager server 102 over the network 106 of the cloud based active password manager system 100. For example, the password management database 104 may be hosted by a distinct server computer from the password manager server 102, thus requiring the password manager server 102 to communicate with the distinct server hosting the password management database 104 over the network 106 to transmit and receive machine-readable computer files containing the profile attributes of the one or more users or the user created list of websites and its details stored in the password management database 104 without moving out of the scope of the disclosed embodiments. Therefore, a person with ordinary skill in the art would understand that the scope of the disclosure is not limited to the password management database 104 as a separate entity, and the functionalities of the password management database 104 can be integrated into the password manager server 102. In an embodiment, the password management database 104 may be realized through various technologies such as, but not limited to, Microsoft® SQL server, Oracle, and My SQL. Further, the password management database 106 may connect to the password manager server 102 using the one or more protocols such as but not limited to Open Database Connectivity protocol and Java Database Connectivity protocol.

The network 106 corresponds to a medium through which content and messages flow between various devices of the cloud based active password manager system 100 such as the password manager server 102, the password management database 104, the host computer 108, and the client devices 110. The examples of the network 106 may include but are not limited to a Wireless Fidelity (Wi-Fi) network, a Wireless Area Network (WAN), a Local Area Network (LAN), or a Metropolitan Area Network (MAN). The various devices in the cloud based active password manager system 100 can connect to the network 106 in accordance with various wired and wireless communication protocols such as Transmission Control Protocol and Internet Protocol (TCP/IP), User Datagram Protocol (UDP), and 2G, 3G, or 4G communication protocols.

The host computer 108 is a computing device used by the user. The user uses the host computer 108 to access multiple websites. In order to access the websites via the internet, the user will generally run a web browser software installed on the host computer 108. The web browser will then connect the host computer 108 to the internet via a modem or any networking means. The user will then type the web address or the URL (Uniform Resource Locator) of the desired website. The web browser then processes the website requested by the user and subsequently transmits the request to the appropriate server of the desired website. The individual website server then responds to the website request and transmits to the web browser a webpage for example, in Hypertext Markup Language (HTML) files corresponding to the requested website. The web browser then launches the webpage and displays it on the screen of the host computer 108. For example, in the exemplary embodiment as displayed in FIG. 1, a Facebook® server 112, a Twitter® server 114, and a Bank of America® server 116 are displayed as examples of the servers of the Facebook®, Twitter®, and Bank of America® websites. The examples of the host computer 108 may include but are not limited to a personal computer, a laptop, a personal digital assistant (PDA), a mobile device, a tablet, or any other computing device. In the present embodiment, only one host computer 108 is shown for simplicity of explanation; however, it should be appreciated that the user may use a plurality of host computers independently or at the same time to access the one or more websites without moving out from the scope of disclosed embodiments.

The client devices 110 include the first client device 110*a* and the second client device 110*b*. The first client device 110*a* is a portable client device and therefore may be used on different host computers available to user since the installation of the portable client device 110*a* on a local machine is not required. The portable client device 110*a* may be plugged in to the host computer 108 for setting up first the communication between the portable client device 110*a* and the host computer 108. In another embodiment, the portable client device 110*a* may communicate using any other communication technology such as Bluetooth, NFC, or the like with the host computer 108. In present embodiment, the portable client device 110*a* is a USB device. In another embodiment, the portable client device 110*a* may be some other device such as a flash memory device without moving out from the scope of the disclosed embodiments. The USB device 110*a* comprises a built-in operating system and has one or more processors. The USB device 110*a* further comprises pre-installed one or more software programs, and has a unique seed value associated to it that is stored in its memory.

The second client device 110*b* is a software based client device. The software based client device 110*b* comprises one or more software programs. The software based client device 110*b* may be installed on the host computer 108. The host computer 108 may include but is not limited to a personal computer, a laptop, a personal digital assistant (PDA), a mobile device, a tablet, or any other computing device. In such a case, the one or more software programs of the software based client device 110*b* will be executed by an operating system of the host computer 108 to facilitate and initiate password generation and/or updating for the one or more website accounts of the user.

In the present embodiment (as shown in FIG. 1), the second client device 110*b* is a mobile phone device on which is installed a password manager software comprising one or more software programs, and has a unique seed value associated to it. In this case, the one or more software programs will be executed by an operating system of the mobile phone device to facilitate and initiate password generation and/or updating for the one or more website accounts of the user. In the present disclosure, a seed value is referred to as a unique identification number of the client devices 110 which may be utilized by various components of the cloud based adaptive password manager system 100 for authentication purposes.

In one embodiment, only one client device 110 may be configured by the user to facilitate and initiate the generation and management of the passwords of the one or more website accounts. In another embodiment, a plurality of client devices 110 may be configured by the user wherein each of the plurality of client devices 110 may be configured to facilitate and initiate generation and management of the passwords of the one or more websites of the user. In yet another embodiment, a plurality of client devices 110 may be configured by the user wherein one of the plurality of client devices 110 may be configured to facilitate and initiate generation and management of the passwords for select few website accounts of the one or more website accounts, whereas the remaining client devices 110 of the plurality of client devices may be configured to facilitate generation and management of the passwords for all of the remaining one or more website accounts of the user. In one example, the one or more websites of the user comprises social networking accounts, banking accounts, and online shopping portal accounts. The first client device 110*a* and the second client device 110*b* may be configured by the user to facilitate and initiate generation and management of the passwords wherein the first client device 110*a* may be configured by the user to generate, update, and manage passwords only for social networking accounts whereas the second client device 110*b* may be configured by the user to generate, update, and manage passwords for social networking accounts, banking accounts, and as well as the online shopping portal accounts. In the same example, the first client device 110*a* may be software based client device installed on a home computer of the user whereas the second client device 110*b* may be a portable USB client device, which the user can carry wherever the user goes.

In an embodiment, the user uses the host computer 108 and initiates a request to execute the password manager application via a web browser on the internet. The web browser then processes the request to access the password manager application by the user and subsequently transmits this request to the password manager server 102 of the cloud based active password manager system 100. The password manager server 102 then responds to the request received and transmits to the web browser the password manager application webpage for user to access it. In another embodiment, the password manager application may be installed by the user on the host computer 100. The user registers an account on the password manager application. In an embodiment, the user may be required to create a login identifier (login ID) and a master password to open the account on the password manager application. After the registration process is completed by the user on the password manager application, an activation identification (activation ID) may be created. In one embodiment, the password manager server generated the activation ID and transmits it to the user account on the password manager application. In another embodiment, the user generates its own activation ID in its account on the password manager application. In yet another embodiment, the activation ID may be created by a combination of user input and the password manager server 102.

In an embodiment, the activation ID is created for a couple of reasons by the user or the password manager server 102. The reasons may include but are not limited to the user authentication, for identity confirmation, for one time set up of client device 110, to establish the communication between the client device 100 and the password manager server 102 etc. The password manager server 102 may issue different types of the activation ID. The activation ID may be a simple four to five digit code with only numbers or letters, and in another case, the activation ID may be a complex sixty-four character case sensitive string with numbers, letters, and special characters. The specific type and number of different activation ID s may vary from one embodiment to another embodiment of the present disclosure. In general, in the present disclosure, the activation ID is generated for a period of time, that is, the activation ID has a pre-defined lifespan, which can be expressed in any unit of time such as seconds, minutes, days, etc. The activation ID has then to be inputted by the user into the client device 110 before it expires to enable the synchronization between the client device 110 and the password manager server 102. In one embodiment, the user can manually enter the activation ID into the client device 110. In another embodiment, the activation ID may be transmitted into the client device 110 using a direct link. In yet another embodiment, if the client device 110 is a portable client device 110a, which may be communicatively coupled to the host computer 108 in any number of ways, wired or wirelessly, to communicate information between the devices 108, 110a. For example, in some cases, the portable client device 110a may be plugged into the host computer 108 to transmit the activation ID. Moreover, in some cases, the portable client device 110a may receive the activation ID from the host computer 108 using Bluetooth or NFC technology.

After the synchronization between the host computer 108 and the client device 110 is completed, the user may be required to input the login details and information related to each of the one or more websites that the user wants to be managed by the cloud based active password manager system 100 under his/her account on the password manager application. The user may also be asked to inform the level of security desired for each of the one or more website accounts of the user. Based on the inputs by the user on the level of security desired for the websites, a recommendation may be provided related to the frequency at which the passwords for the websites shall be updated or the strength/length of the password to be generated by the cloud based active password manager system 100. The user can accept, modify, or decline the recommendations provided. The user may also define a set of rules based on which the passwords for each of the one or more website accounts be updated. The set of rules may be specific to each of the one or more website accounts or the set of rules may be the same for all of the one or more website accounts. The set of rules may comprise information such as a frequency at which the password for a given website account be updated, the length of the password to be generated, the strength of the password to be generated, the character types to be included in the generated password, or the like. The set of rules may also comprise information that for a given website, the password may be changed only upon the receipt of the "change password" notification from the given website account. All the information inputted by the user on the password manager application will then be stored in the password management database 104. In an embodiment, the information stored in the password management database 104 is accessible by the password manager server 102, the client device 110, and the user.

After inputting the information related to the one or more websites on the password manager application, the client device 110 then facilitates and initiates the automatic generation and updating of the passwords of the one or more website accounts listed by the user based on the rule indicating pre-determine time frequency and other one or more rules defined by the user. The generation and updating of current passwords to replace with new passwords occurs based on an algorithm wherein the inputs to the algorithm comprises at least some of the information stored on the client device 110 and the password manager server 102. The information stored on the client device 110 may include the seed value associated to the client device. The information stored on the password manager server 102 may include a time-date stamp value indicating the time and date of when the current password that is being replaced was generated. In another embodiment, the password management database 104 may not be a separate entity and be an integral part of the password manager server 102. In such an embodiment, the passwords for each of the one or more websites are then generated based on at least the information stored on the client device 110 and the password manager server 102.

Thus, in order to generate a new password for a given website account among the one or more websites, the client device 110 may run a pre-stored algorithm stored in its memory to generate a new password for the given website account of the one or more websites. The input parameters to the algorithm comprises at least the merged value of the seed information of the client device 110 which was requested to update the password by the user, a time-date stamp of the current password of the given website account of the one or more websites stored in the password management database 104, and a plurality of random digits generated by the client device 110. In another embodiment, the algorithm to generate new passwords may be stored in the password manager server 102. In an embodiment, due to usage of time-date stamps as one of the input values to generate a new password for any given website account allows the algorithm to never generate same passwords again for the given website account. In the embodiment, the new passwords generated for the one or more websites of the user are never stored in any of the databases of the cloud based active password manager system 100. Therefore, every time the user request to login into any given website account using the client device 110, the client device 110 in combination with the password manager server 102 re-generate the password (which has been previously generated for the given website account but never stored anywhere on the system 100) and then inputs it into the given website account to allow the given website account features access to the user.

Thus, in summary, when the user uses the cloud based adaptive password manager that may employ a portable client device 110a plug-in or a software based client device 110b browser plug-in on the host computer 108, the client device is configured to detect when the user has accessed a given website which is in the list of websites to be manager by the user. The client device then facilitates the automatic population of the user's credentials such as the login ID and the current password for the given website to cause the user to be automatically logged into the given website. In an embodiment, the client device may be configured to auto-populate the credential fields of the given website. In another embodiment, the client device may be configured to auto populate and then credentials to be submitted to cause the user to be automatically logged into the given website.

Figure 2A:
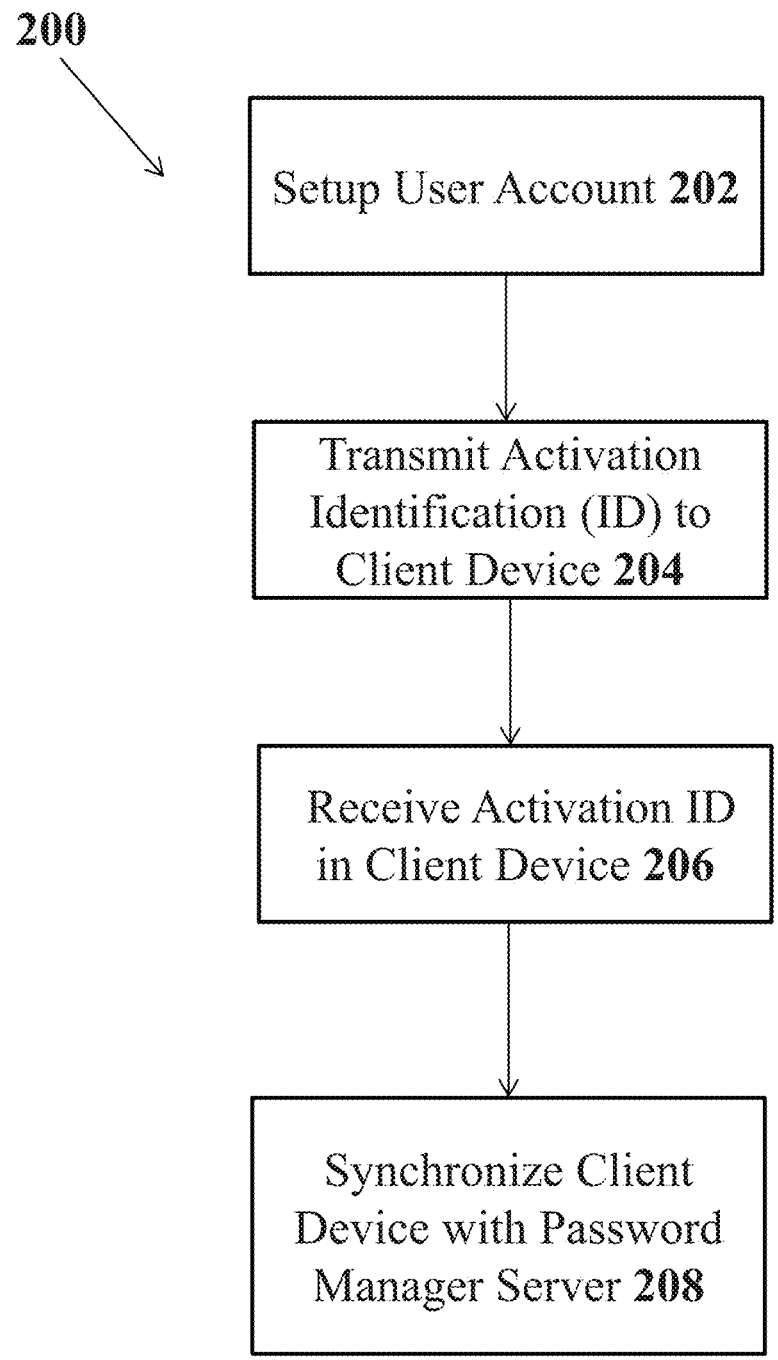
FIG. 2A illustrates steps of a method for initial registration of a user on a cloud based active password manager system in accordance with at least one embodiment.
Figure 2B:
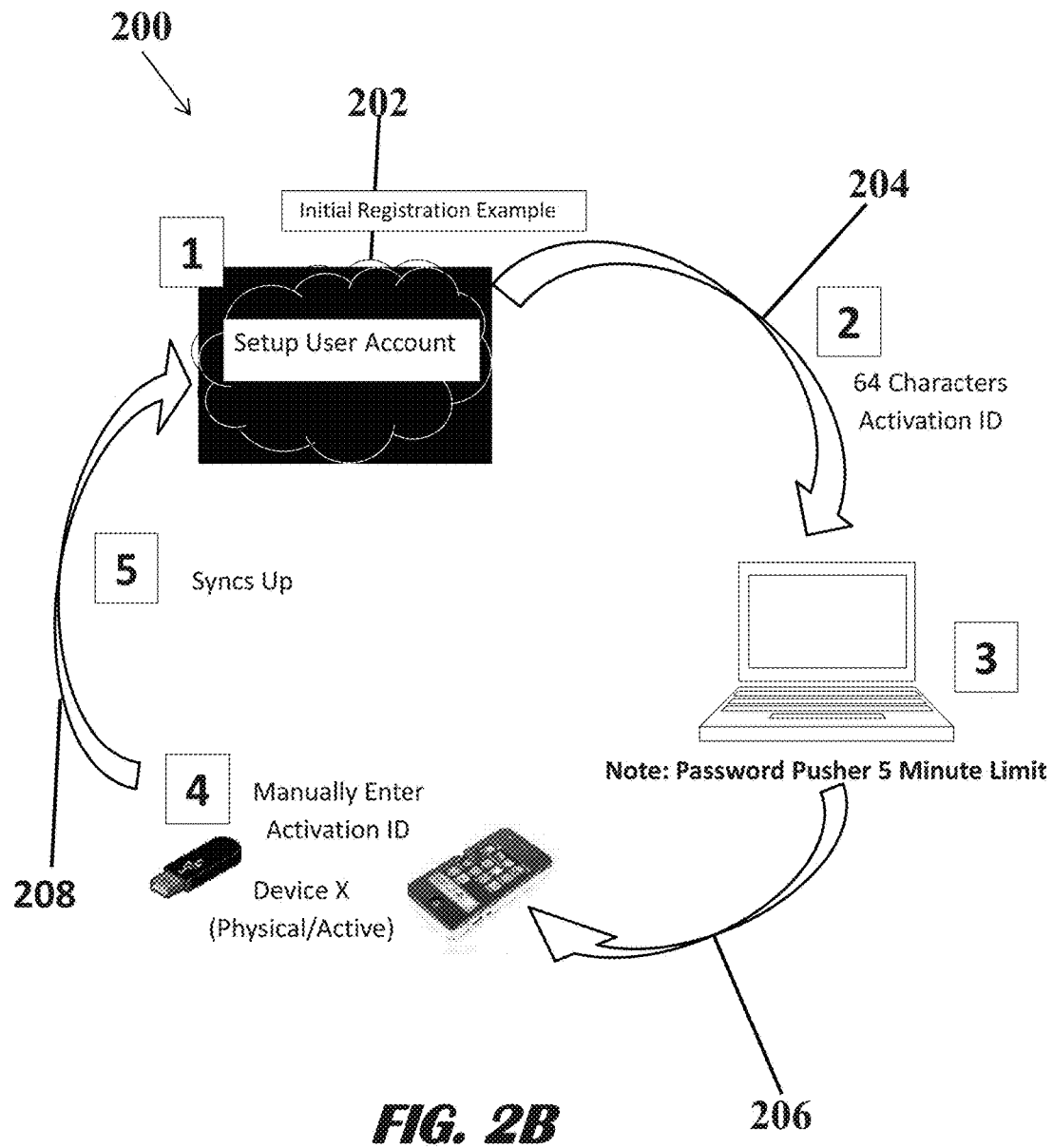
FIG. 2B illustrates initial registration process of a user on a cloud based active password manager system in accordance with FIG. 2A.

FIGS. 2A and 2B show steps of a method for initial registration of a user on a cloud based active password manager system in accordance with at least one embodiment.

At step 202, the user executes the password manager application on the host computer. Thereafter the user sets up the account on the password manager application of the cloud based active password manager system to generate, update, and manage the passwords of the one or more website accounts of the user. The one or more website accounts may include but are not limited to social networking accounts, online shopping accounts, banking accounts, or the like. In one embodiment, a single user may register for a single client device to generate, update, and manage the passwords of the one or more website accounts. In another embodiment, a single user may register for a plurality of client devices to generate, update, and manage the passwords of the one or more website accounts. In order to open the account, the user may have set up a login ID and a master password.

At step 204 and 206, after the successful setting up of the account by the user on the password manage application, then the user will create the activation ID or receive the activation ID in his/her account on the password manage application from the password manager server. In the present embodiment, the activation ID created by the password manager server upon receive a request from the password manager application. The activation ID is 64 characters in size however, it should be noted that the size and the number of characters/symbols of the activation ID may vary in other embodiments of the present disclosure without moving out from the scope of the disclosed embodiments. It should be noted that a separate activation ID could be received for each of the client devices the user is adding to his/her account at the password manager application.

The user then transmits the activation ID to the client device. In one embodiment, the activation ID can be manually entered into the client device. In another embodiment, the activation ID can be entered through a direct link into the client device. The activation ID has to be transmitted to the client device within a pre-defined time period. In the present embodiment, the pre-defined time period is five minutes; however, the value of pre-defined time period can be any value without moving out from the scope of the disclosed embodiments. If the activation ID is not transmitted into the client device within the pre-defined time-period, then the activation ID will expire and a new activation ID has to be created and/or requested.

At step 208, after the activation ID has been successfully entered into the client device before the pre-defined time period expires, then the client device and the password manager server is synchronized and then establishes communication among the various devices. In one example, the synchronization of cryptographic key information occurs between the client device and the password manager server. The password manager server will then receive the information about the user and the user's one or more internet websites associated with the particular client device that was synchronized with the password manager server. In one embodiment, if the client device is a physical based client device such as a USB, then after the synchronization between the USB and the password manager server, the password manager server may capture and store the identification number of the USB device as an identification data to verify the identity of the user for future communications between the USB device and the password manager server. In another embodiment, if the client device is the software based client device installed on the computing device, then the password manager server may capture and store the identification number of the computing device as an identification data to verify the identity of the user for future communications between the computing device and the password manager server. Therefore, after the synchronization between the client devices and the password manager server is completed, as and when the user requests the client devices to log into his/her one or more internet websites, the client devices read the request and works along with the password manager server to generate or re-generate the password for any of the one or more internet websites the user wishes to access. In an embodiment, the user may not even have to request to the client device in order to log into any given internet website account as the client device if plugged into the browser or the user computing device may automatically detect when the user has navigated to a given internet website to automatically populate the login credentials of the given internet website account. In an embodiment of the present disclosure, the password manager server may respond with, e.g., "authorized" or "unauthorized" on the client device user interface, based on whether the user client device was identified and authorized to access to the account, which may provide access to a website's resources or a network resource.

Figure 3:
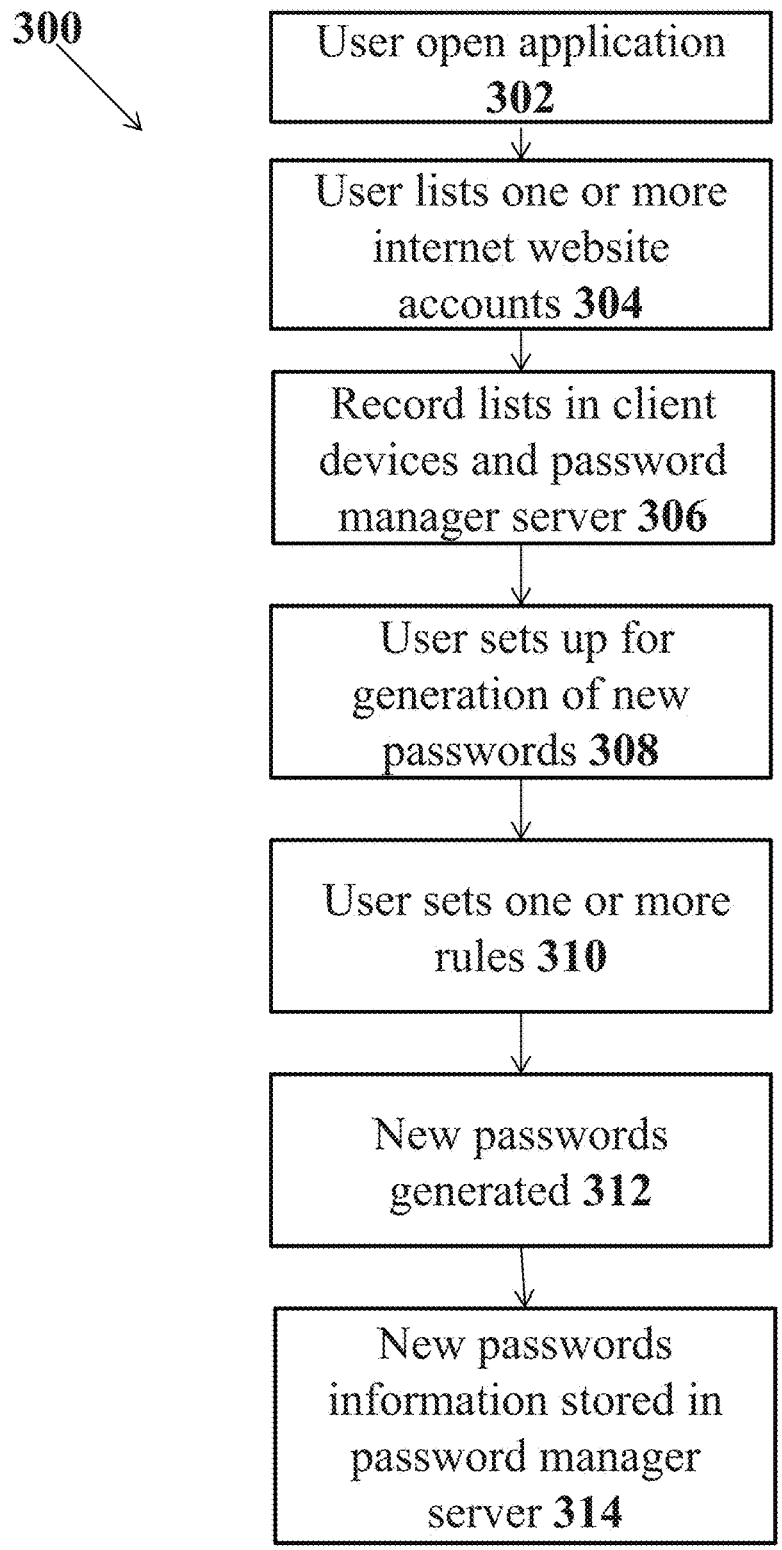
FIG. 3 illustrates steps of a method for generating passwords for one or more website accounts in accordance with at least one embodiment.

FIG. 3 shows steps of a method for generating passwords for one or more websites in accordance with at least one embodiment.

At step 302, using a host computer, the user executes the password manager application. In response to the user selection, the host computer launches the password manager application and allows the user access to features of the password manager application. In one embodiment, the password manager application may be password protected in order to prevent access to unauthorized users attempting to access the user's account or account information. In such embodiments, the user may register a password or a pin number with the password manager, which is then used to access the features of the password manager application.

At step 304, the user lists each of the one or more websites for which the passwords need to be generated, updated, and managed in the future on the password manager application. The list of the one or more website accounts inputted by the user is then saved in the password management database. In an embodiment, the password manager server may have a pre-stored list of popular websites accessible to the user on the password manager application. The pre-stored list of websites may be categorized under various sub-headings, such as social networking category, banking category, online shopping category, airline booking category, and the like. Thus in one example embodiment, the user may first look into the list of pre-stored websites and select the websites for which the user wants to automate the password generation, the password updating, and the password management. The user can later manually enter the details of the remaining websites that were not present in the pre-stored list. The details of the websites that need to be submitted by the user comprises the name of the website account, the URL of the website account, current user ID and password of the website account, and the URL to change password of the website account. In another embodiment of the present disclosure, the details of the websites provided by the user may be different to what have been described above without moving out from the scope of the disclosed embodiments.

In this example, after inputting the details of each of the websites, the user seeks to manage the password manager application then assigns an index value to each of the one or more websites of the user listed in the password manager application for periodic password generation, updating, and management. The index value is assigned to each of the one or more websites by one or more pre-loaded software algorithms of the password manager server. In another embodiment, the index value is assigned to each of the one or more websites by one or more pre-loaded software algorithms of the client device. The index value is assigned generally in a random manner to each of the one or more website accounts of the user. The index value assigned to each of the one or more websites is then stored in the password management database and on the client device. In one embodiment, the user may first input the details of all the websites and then the websites are assigned an index number by the password manager server. In another embodiment, the user may first only list all the websites. All the websites are then assigned an index by the password manager server. After the assigning of the index is complete, then the user submits the inputs to the registration fields of each of the one or more websites such as the current user name, current password, password change URL, and the required fields/inputs for changing the password for all the websites.

In one example of the exemplary embodiment, the user may want to include the login credentials for a Facebook® account and a Bank of America® account. The Facebook account may be assigned Index 1 and the Bank of America account may be assigned Index 2. For each of these accounts, the inputs information into registration fields using a graphical user interface (GUI) associated with the password manager, which may be a webpage hosted by the password manager system or a software application GUI installed on the user's computer. Examples of inputted information, provided by the user through the GUI's fields, may include a user name, current password, password change URL, and the required fields for changing the password. In this example, for Index 1 (i.e., the user's Facebook account), the fields may be the user's Facebook user identifier (user ID), the user's Facebook password, the URL for changing one's Facebook password, indicators for which fields are required, and indicators of which interactive controls (e.g., buttons, radial dials) may be on the page. Below is an example of the information the user may input in the GUI fields for Index 1:

Facebook user ID: JoeCool@NewISP.com
Facebook Password: starter_password
Password Change URL: www.facebook.com/settings?tab=account& section=password& view
Required Fields: Current Password, New Password, Reenter New Password
Input buttons: Save Changes, Cancel At step 306, record user's one or more websites list. For example, after inputting the answers to the registration fields of the index 1, the index 1 data is then recorded in the client device. The data of the index 1 is further encrypted and stored in the password management database. Thus, the registration data of index 1 is stored at both the client device as well as in the password management database but may be in different formats.

At step 308, the user then sets up for generation of new passwords and updating of old passwords with the new passwords for the one or more websites. The user launches the password manager application. The user then selects the password manager screen field in the password manager application. The user then goes to the password manager screen and selects "Create New Password" field. After selecting the "Create New Password" field, the user will then be prompted to select the one or more rules.

At step 310, the user the selects the one or more rules. In one embodiment, one rule is selected to define a future change frequency of the password. The user is provided with an option to provide a value for future change frequency in seconds, minutes, hours, days, weeks, months, or years. Another rule will be to select the length and the strength of the password. In another embodiment, the user may submit its own rules if there is no such pre-defined rule available to the user on the password manager application.

At step 312, based on the value selected by the user for the future change frequency and other one or more rules, the user's old passwords will be replaced with new passwords automatically. In an embodiment, the new passwords are generated based on at least the seed value stored in the client device, the time-date stamp of the generation of the current password that is being replaced with the new password. The current password time-date stamp is stored in the password manager database. In addition to the seed value and the time-date stamp, the client device will also generate a set of random numbers that will be merged with the seed value and the time-date stamp. The merged value will then be used by the password manager server to generate the new password.

In one embodiment, when a user requests to generate a new password for the Facebook account, then the client device generates six random digits with its seed value. The seed value may be, for example. 123456789abcdef0123456789abcdef0. The six random digits generated for example are 123456. The time-date stamp of the generation of the current password of the Facebook that is being replaced is retrieved from the password manager server. The value of time-date stamp for example is 01272015:124545. Thereafter, the seed value, the time-date stamp, and the random digits are combined, for example, to produce 123456789abcdf173249dfce0246, which is feed into an algorithm run on the client device that produces "Adsfsaieo%%@^DWQdet" as a new password. Thus, the Facebook old password is now replaced with this new password "Adsfsaieo%%3dts@^DWQdet".

At step 314, the following partial key 01272015124545123456 (which is the merged value of the time-date stamp and the random number generated by the client device) is stored in index 1 in the password manager server. In addition to the partial key, a status field indicating the valid flag and password change in progress is also mentioned and stored for each index in the password manager server.

For simplicity of explanation, an example table, Table 1, is depicted below that will be stored in the password manager server. In the example table shown below, the table depicts three index numbers for three different website accounts of the user, and for each of the three index, a partial key, a valid flag, and a status of password change in progress or not is mentioned. Table 1 shows examples of the types of information stored into a password manager server or database.

| Index | Partial Key | Valid Flag | Password Change in progress |
|---|---|---|---|
| 1 | 01272015124545123456 | 1 | 0 |
| 2 | 01252015081517789abc | 1 | 2 |
| 3 | 01222015141554456789 | 0 | 0 |

In the above table, the partial key represents the merged value of the time-date stamp and the random number generated by the client device. The valid flag represents whether the entry is valid or not. The final column represents that whether any password change for the website represented by index 2 is valid or not. Based on the values shown in the above table, index 1 is an example of a valid entry that any client device can use to log in. Index 2 is an example where it is indicated that client device 2 has a password change in progress, and Index 3 is an example of an entry that is no longer valid, as it has no valid flag.

In an embodiment, for example, for the Facebook account discussed above, when the new password generation is scheduled based on the pre-defined password change frequency set by the user, and then the client device will communicate with the password manager server to update the old password of index 1 with a new password. The password manager server will authenticate if the client device that is requesting to update the new password is authenticated or not. If the authentication is granted then the password manager server will update the seed value of the client device in the password change in progress column of index 1. The new status of the password change column will exist until the new password is generated. Thereafter, the same process as discussed above of generating a new set of random number, and subsequently merging them with the seed value and the time-date stamp of the current password being replaced is followed. The merged value is fed as an input to the algorithm that is being run on the client device and a new password is generated.

In an embodiment, a plurality of client devices may be employed by the user for generating, updating, and managing the passwords of the one or more websites. The user can register any number of client devices to its single password manager account opened on the password manager application. If the user wants to register a new client device to its already existing account, then the user will synchronize the new client device with the password manager server as discussed above. After the new client device and the password manager server is synchronized, then the communication process is established between them in order to coordinate with each other to generate, update, and manage the passwords of the one or more websites of the user.

After the synchronization of the new client device and the password manager server, the new client device is registered and verified by the password manager server. Thereafter, the new client device receives the information comprising pending message queue, time-date stamps, and other relevant information that was generated by the existing client device(s) in the encrypted form. The new client device then facilitates the decryption of the pending messages queue and other information in order to register the index table of the website accounts of the user and URLs of all the website accounts of the user associated to the user password manager account.

In another embodiment, the new client device can be manually registered to the user's password manager account. In the manual registration method, a physical key is programmed in to the new client device. The physical key has to be programmed into the new client device within a pre-defined period of time. Thus, the user can manually enter the seed (static base) of the registered client device into the new client device. The manual method of registering the new client device is a very secure technique since the user doesn't need to log into his/her password management account to access the information present in the password manager server After the registration of the new client device is completed, the new client device can be utilized by the user for auto-logging into any of the one or more websites, or to generate, update and manage passwords for each of the one or more websites of the user.

In an embodiment, the plurality of client devices may be employed by the user for generating, updating, and managing the passwords of the one or more websites. The plurality of client devices may include a first client device and a second client device. The first client device may be configured to manage and update password of a first and a second website. The second client device may be configured to manage and update password of the first, the second, and a third website. The configuration of the client devices, that is, which client device will have access to which website accounts is set up by the user and the information related to it is stored in the password manager database and is accessible by the password manager server. Thus, when the first client device requests the password manager server for login into the first website then the password manager server checks whether the first client device has access for managing the first website or not. After the first client device is authenticated, (i.e., access rights are found), the password manager server then works with the first client device to log into the first website. In the same example, if the first client device will try to log into the third website for which it has no access, the request for log in will be denied by the password manager server.

In an embodiment, the user can also de-register any of the client devices that are associated to his/her password manager account. For example, if any one of the client devices is stolen, then although the stolen client device might be password protected, the user will still want to de-register the stolen client device for safety reasons. In order to de-register any of the client devices, a re-index operation of all the indexes stored in the password manager server is performed by any of the existing client devices. Upon successful completion of the re-index operation, no existing indexes are reused. In addition, all the valid flags associated to the old passwords for each of the one or more websites of the user are cleared, and the encrypted messages are sent to each of the user's client devices detailing new index values except for the client device that needs to be de-registered. Thus, the de-registered client device is unable to facilitate logging into any of the one or more websites of the user as all the indexes stored on the password manager server are reshuffled and the de-registered client device is unable to match its seed value with the right index value of a given website account in order to successfully log into the given website account of the one or more websites of the user.

Figure 4:
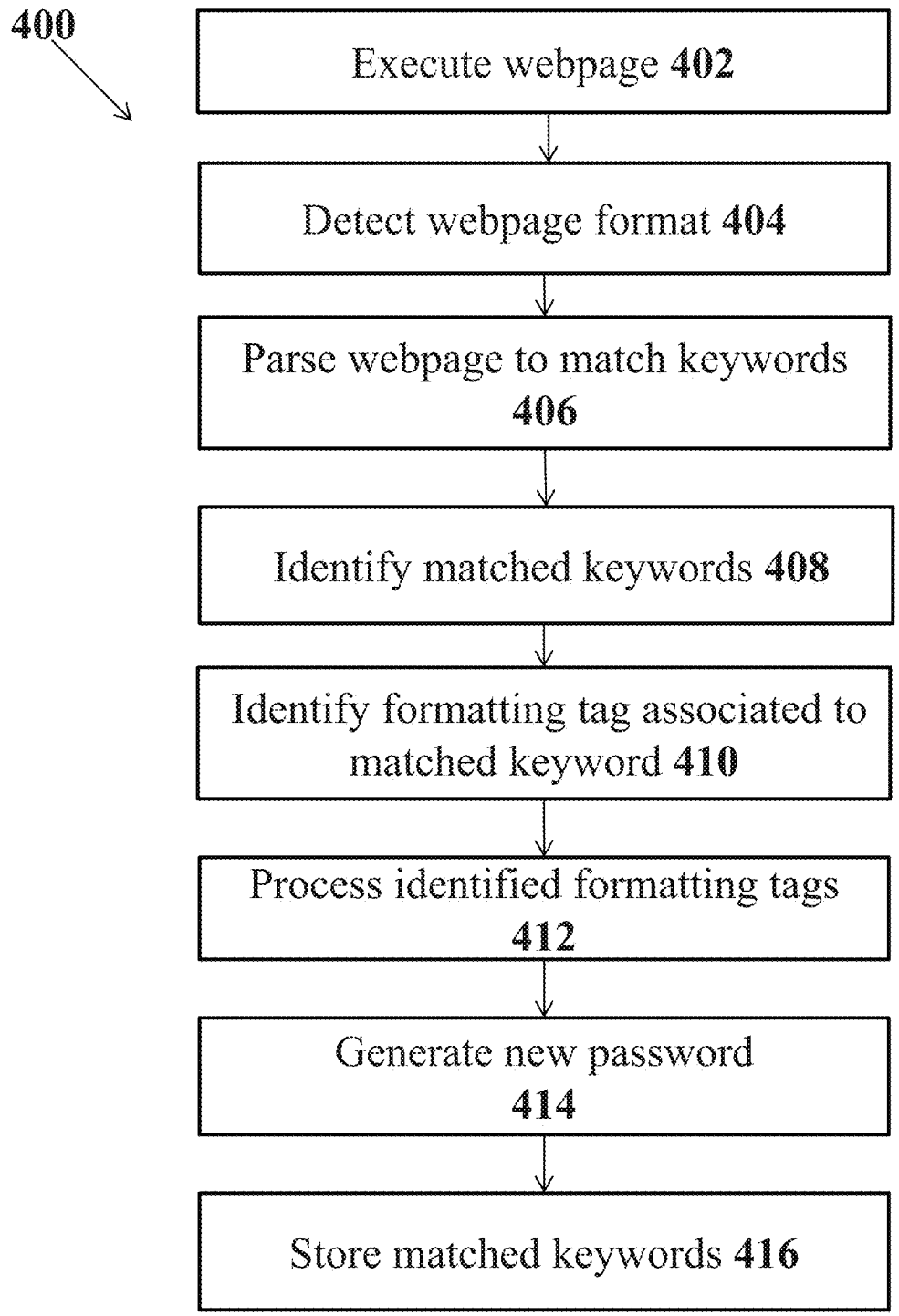
FIG. 4 illustrates steps of a method for an adaptive learning algorithm of the cloud based active password manager system in accordance with at least one embodiment.

FIG. 4 shows steps of a method for an adaptive learning algorithm of a cloud based active password manager system in accordance with at least one embodiment. The present disclosure provides this method for analyzing webpages of the one or more websites of the user formatted using the HTML or any other markup language to automatically identity, extract and then input desired information for generating, updating, and managing passwords of the one or more websites of the user. In one embodiment, the features of the method are embodied in the adaptive learning algorithm that searches, identifies, and then extracts desired pieces of information from the webpages of the one or more website accounts automatically after the minimal manual setup. The adaptive learning algorithm automatically analyzes the webpages with different content if they have the same or similar formats.

The cloud based active password management system implements the adaptive machine learning algorithm to perform the functions of generation, updating, and managing passwords of the one or more websites of the user. The machine-learning algorithm can be implemented in one or more ways without moving out of the scope of the disclosed embodiments. In one embodiment, the machine-learning algorithm may be implemented as a stand-alone machine learning application. In another embodiment, the machine-learning algorithm may be implemented as a web browser add-on or as a web browser extension on the host computer of the user.

At step 402, the password manager server sends a request to a webserver to download the one or more web pages of the website. After receiving the request, the web server returns the requested one or more web pages through the network. In one example, when the user selects the hypertext link of the given webpage, the web browser reads the URL associated with the hypertext link. The password manager server then connects the web browser with the web server of the given webpage and submits the request for the webpage file identified in the hypertext link. The web server then sends the requested webpage file that is interpreted by the web browser and displayed to the user.

At step 404, after the webpage of the website account is executed, then the password manager server identifies the format of the webpage. The webpage could be in various formats such as HTML (Hypertext markup language), XML (eXtensible markup language), PHP, Ruby, Java, JavaScript, Perl, Python, ASP, and ASP.NET. In an embodiment, the webpage is generally formatted according to a standard page description language. The standard page description language is HTML language. The HTML comprises text, and can further reference graphics such as images, sound, and video data. In another embodiment, the web page may be formatted or written using XML. Such webpages are generally dynamically generated webpages that are configured to inter mix the data retrieved at run-time with the static page layout commands.

At step 406, after the format of the webpage is detected, the password manager server parses a software code of the webpage to match one or more field keywords from a list of field keywords with one or more keywords on the webpage. In one embodiment, the password manager server parses the software code of the webpage identified in any format, such as the hypertext mark-up language (HTML) format, the Extensible Mark-up Language (XML), the Extensible Hypertext Mark-up Language (XHTML), or the Standard Generalized Mark-up Language (SGML). In another embodiment, the password manager server parses the software code of the webpage formatted in a given format only. For example, the password manager server may parse the webpage formatted in HTML only. In this example, when the format of the webpage is found to be in XML and the parsing is performed by the password manager server only for HTML formatted webpages, the password manager server may employ techniques that the webpage content to be modified and presented in custom-tailor formats such as the HTML format or any other format acceptable by the password manager server. The modification may include but not limited to removal of images, conversion of one dialect to another, or the like. In an embodiment, the one or more field keywords that are being matched are stored on the password manager database. The one or more field keywords are selected from the list of field keywords based on their nearness to identify either the login field or the change password field on the webpage that is being parsed. The one or more field keywords may include a first set of field keywords and a second set of field keywords. The first set of field keywords comprises terms such as "password", "reset", "user", "panel", "old password". "confirm password", and "change. The second set of field keywords comprises terms such as "login", "sign in", and "sign-in. In an embodiment, generally the first set of field keywords are matched first, and if there is no result found, then the second set of field keywords are matched. In another embodiment, there may be multiple small sets of field keywords selected from the set of field keywords.

At step 408, after the parsing is completed, the one or more matches on the webpage are identified. The one or more matches are the one or more field keywords that match the one or more keywords in the code of the webpage. The one or more matches will be hereinafter referred as matched keywords or, one or more matched keywords. In one embodiment, the webpage format may be identified to be in HTML file. The HTML file will thus contain the source code of the webpage, and may further comprise a plurality of HTML tags that encloses text between them. The password manager server may then parse given webpage of the website by searching the HTML code to locate text input fields for entering a user name, a password, or other login credentials for accessing the contents of the website.

At step 410, a formatting tag associated to matched keywords is identified. The identified formatting tag is then searched within a list of formatting tags to determine the type of the identified formatting tag. In an embodiment, the list of formatting tags is stored on the password manager server. The list of formatting tags comprises a link tag, a form tag, an image tag, or a text tag. In one embodiment, if the matched keyword is found to be associated to the link tag then the link is executed. After the link is executed, the new webpage that is opened is parsed as described in step 406 to match the one or more field keywords with the one or more keywords on the new webpage.

At step 412, the identified formatting tags associated to each of the matched keywords are processed. The password manager server inputs one or more data inputs into one or more fields of the webpage respectively. The one or more fields are identified by the one or more field keywords matching the one or more keywords in the code of the webpage. In other words, the one or more fields are identified based on the one or more matched keywords. Each respective data input is based upon the formatting tag associated with the field keyword that identifies the respective field, and at least one data input is a new password for the website account.

At step 416, the information pertaining to successful generation of new password for the website account is stored in the password manager database. In order to achieve this, the password manager server generates a record associated with the website in the password manager database. The record contains the information pertaining to the new password of the website account. The information comprises the one or more matched keywords and the formatting tags associated with each input field. The information may be used by the password manager server to change one or more passwords used to access the website for next time, either for the same or the different user.

The adaptive learning algorithm of the cloud based active password manager system can be implemented in one or more ways. In one embodiment, as discussed above, the computing device will facilitate the launching of the webpage, parse the HTML format of the webpage, and then search for the one or more field keywords such as "password", "reset", and/or "change". In another embodiment of the present disclosure, the adaptive learning algorithm of the cloud based active password manager system will require the user to reset the password for the first time, and the password manager application will capture the steps followed by the user to reset the password of the website account. In this method, adaptive learning algorithm captures the procedure followed by the user on the website to navigate to a particular webpage that has input fields for changing the password of the website account. Thus, the adaptive learning algorithm of the password change application records all the steps followed by the user and text inputs of the user from the point of executing the given website on the web browser to changing of the password of the website account.

The foregoing method descriptions and the process flow diagrams are provided merely as illustrative examples and are not intended to require or imply that the steps of the various embodiments must be performed in the order presented. The steps in the foregoing embodiments may be performed in any order. Words, such as "then," or "next," are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for managing passwords using a remote password manager server communicating with a client device to provide log-in credentials permitting access to a remote web server using a web browser, the method comprising:
   registering the client device with the password manager server using an activation ID;
   specifying one or more websites requiring passwords to be managed by the password manager server and security parameters associated with each website;
   synchronizing the password manager server and the client device;
   identifying, by the password manager server, in a software code of a webpage of a website accessed from the remote web server by the client device one or more keywords matching one or more field keywords in a list of field keywords, the list of field keywords comprising field keywords identifying a login field and a change password field;
   parsing, by the password manager server, the software code of the webpage based upon one or more matches between the one or more keywords in the code of the webpage and the list of field keywords;
   identifying, by the password manager server, in the software code of the webpage a formatting tag associated with each of one or more matched keywords from the list of field keywords, each formatting tag matching one or more formatting tags in a list of formatting tags;
   inputting, by the password manager server, one or more data inputs into one or more fields of the webpage respectively, the one or more fields identified by the one or more field keywords matching the one or more keywords in the code of the webpage, wherein each respective data input is based upon the formatting tag associated with the field keyword that identifies the respective field, and wherein at least one data input is a new password for the website account;
   generating, the password manager server, a record associated with the website in a password manager database, the record containing information pertaining to the new password of the website account, wherein the information comprises at least the one or more matched keywords and the formatting tags associated with each input field;

generating, by the password manager server, one or more new data inputs based upon the information stored in the record; and inputting, by the password manager server, the one or more new data inputs into the one or more fields of the webpage according to the formatting tag associated with each respective field, thereby updating the password for the website.

2. The computer-implemented method of claim 1, further comprising sending, by the password manager server, a request to a webserver to download one or more web pages of the website.

3. The computer-implemented method of claim 1, wherein at least a portion of the software code of the website is selected one or more from the group consisting of: HTML (Hypertext markup language), XML (eXtensible markup language), PHP, Ruby, Java, JavaScript, Perl, Python, ASP, and ASP.NET.

4. The computer-implemented method of claim 1, wherein the list of one or more field keywords are stored in the password manager database, and wherein the list of field keywords comprises a first set of field keywords and a second set of field keywords.

5. The computer-implemented method of claim 4, wherein a field keyword in the first set of field keywords is selected from the group consisting of: "password", "reset", "user", "panel", "old password", "confirm password", and "change".

6. The computer-implemented method of claim 4, wherein a field keyword in the second set of field keywords is selected from the group consisting of "login", "signin", and "sign-in".

7. The computer-implemented method of claim 1, wherein the formatting tag in the list of formatting tags is selected from the group consisting: a link tag, a form tag, an image tag, and a text tag.

8. The computer-implemented method of claim 7, wherein identifying the formatting tag further comprises:
  responsive to the password manager server determining that the formatting tag is a link tag comprising a URL address:
    accessing, by the password manager server, a new webpage using the URL address of the link tag; and
    parsing, by the password manager server, the new webpage using the list of one or more field keywords and the list of one or more formatting tags.

9. The computer-implemented method of claim 1, wherein the registering step further comprising:
  creating a userID and a master password for the client device on the password manager server;
  creating the activation ID by the password manager server, the activation ID having a pre-defined lifespan for its use;
  communicating the activation ID to the client device directly; and
  using the activation ID received by the client device to enable the synchronization of the client device and the password manager server.

10. The computer-implemented method of claim 1, wherein the new password for the website is never stored on non-transitory machine-readable storage media.

11. A network based client-server processing system for managing passwords using a remote password manager server communicating with a client device to provide log-in credentials permitting access to a remote web server using a web browser, the system comprising:
  a password manager database hosted on one or more computing devices comprising non-transitory machine-readable storage media, the password manager database configured to store one or more records of one or more accounts, a list of one or more field keywords identifying data fields in software code of a webpage, and a list of one or more formatting tags indicating format rules for a data field; and
  the password manager server comprising a processor configured to:
    accepting registration of the client device with the password manager server using an activation ID;
    receiving specification of one or more websites requiring passwords to be managed by the password manager server and security parameters associated with each website;
    synchronizing the password manager server and the client device;
    identify, in the software code of the webpage of a website, one or more field keywords identifying one or more respective data fields, using the list of field keywords, wherein the one or more field keywords identified in the webpage comprises a login field and a change password field;
    identify, in the software code of the webpage, using the list of formatting tags, one or more formatting tags for each respective data field identified by the one or more field keywords in webpage;
    provide a data input into each of the one or more data fields in the webpage in accordance with the formatting rules for the respective data field, wherein at least one data input is a new password for the website account; and
    generate a record associated with the website in the password manager database, the record containing information pertaining to the new password of the website account, and the information comprising the one or more field keywords in the webpage and each formatting tag associated with each data field identified by the one or more field keywords.

12. The network based client-server processing system of claim 11, wherein the password manager is further configured to send a request to a webserver to download one or more web pages of the website.

13. The network based client-server processing system of claim 11, wherein at least a portion of the software code of the website is selected from the group consisting of: HTML (Hypertext markup language), XML (eXtensible markup language), PHP, Ruby, Java, JavaScript, Perl, Python, ASP, and ASP.NET.

14. The network based client-server processing system of claim 11, wherein the one or more list of field keywords comprises a first set of field keywords and a second set of field keywords, and wherein the list of one or more field keywords are stored in the password manager database.

15. The network based client-server processing system of claim 14, wherein a field keyword in the first set of field keywords is selected from the group consisting of: "password", "reset", "user", "panel", "old password", "confirm password", and "change".

16. The network based client-server processing system of claim 14, wherein a field keyword in the second set of field keywords is selected from the group consisting of "login", "sign in", and "sign-in".

17. The network based client-server processing system of claim 11, wherein the formatting tag in the list of formatting tags is selected from the group consisting: a link tag, a form tag, an image tag, and a text tag.

18. The network based client-server processing system of claim 11, wherein the new password for the website is never stored on non-transitory machine-readable storage media.

* * * * *